Feb. 14, 1950     O. R. SWEENEY ET AL     2,497,700
COUNTER-CURRENT EXTRACTION APPARATUS
Filed July 7, 1944
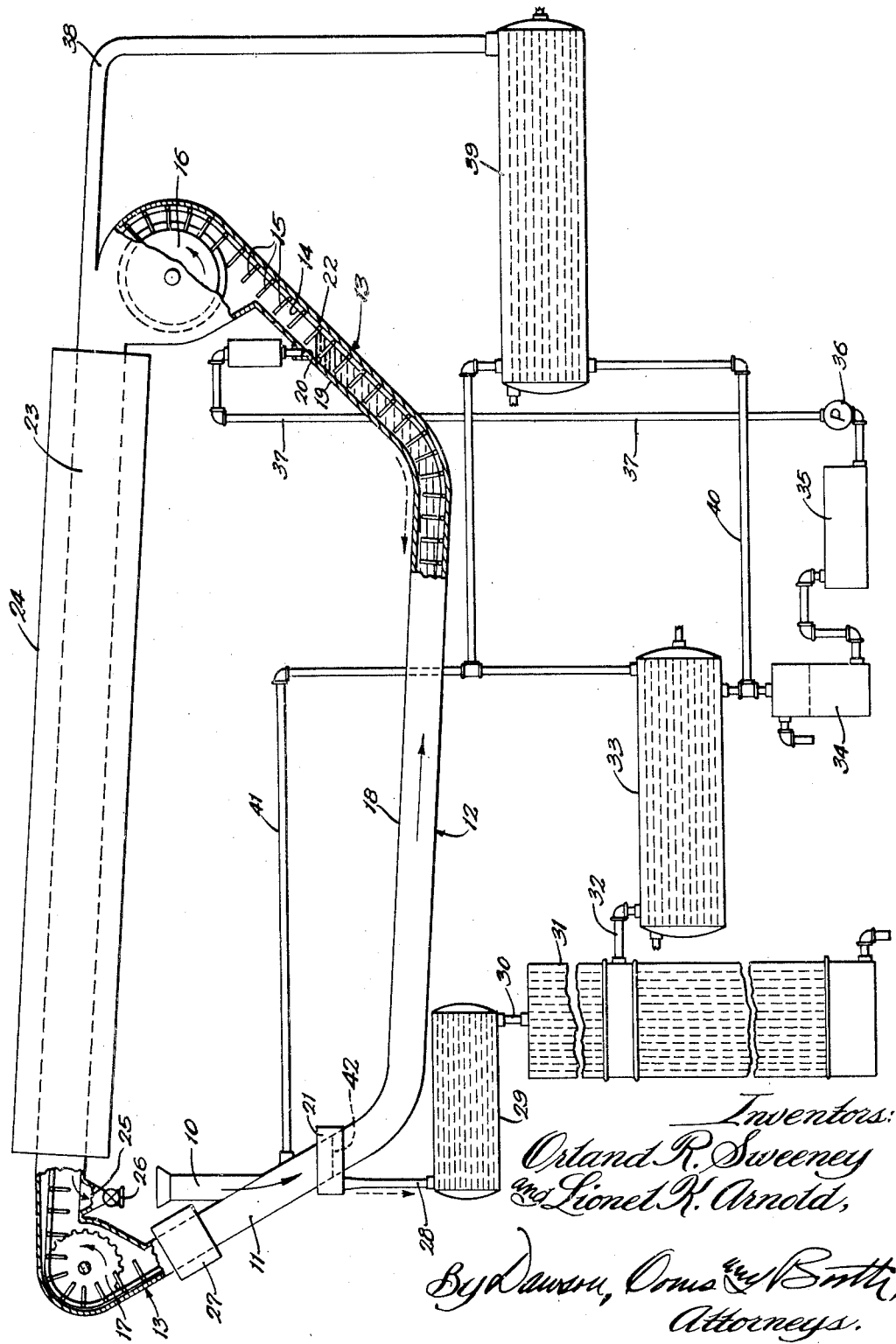
Inventors:
Orland R. Sweeney
and Lionel K. Arnold,
By Dawson, Ooms and Booth,
Attorneys.

Patented Feb. 14, 1950

2,497,700

UNITED STATES PATENT OFFICE 2,497,700

COUNTERCURRENT EXTRACTION APPARATUS

Orland R. Sweeney and Lionel K. Arnold, Ames, Iowa, assignors to Iowa State College Research Foundation, Ames, Iowa, a corporation of Iowa Application July 7, 1944, Serial No. 543,942

5 Claims. (Cl. 23—270)

This invention relates to an extraction apparatus and process, and particularly to an apparatus and process for the recovery of oils, fats or waxes from solids containing these materials.

The invention is particularly suitable for the treatment of such materials as soy beans and seeds, such as cottonseed, flaxseed, and in general the various solid materials, whether of vegetable or animal origin and containing oils, fats or waxes.

An object of the invention is to provide an efficient and effective extraction of oils, fats, and waxes from solid materials containing the same, and particularly in a continuous extraction process in which the solid remaining in the solid material after extraction is recovered for reuse. Still another object is to provide an apparatus and process for the economical and efficient use of heat to remove residual solvent from the extracted material and to heat the solvent during the extraction process. A further object is to provide an efficient heat-exchange system for the extraction process in which local over-heating of the solvent and material being extracted is avoided.

Another object of the invention is to provide an apparatus and process in which the heat used in removing residual solvent from the extracted material is utilized in improving the extraction. Yet another object is to obtain efficient extraction by reason of the application of heat to the solvent so as to lower the viscosity of the solvent and obtain maximum penetration and flow of the solvent. Yet another object is to apply heat to the solvent in such a manner as to provide a temperature gradient between the solvent as it is introduced and the solvent which contains the maximum quantity of the oil, fat or wax, the temperature of the solvent being higher as the extraction proceeds. A further object is to provide an apparatus and method in which finely-divided solid materials are readily separated from the oil-bearing solvent.

The invention is illustrated in the accompanying drawing which is a side elevational view, partly in section, of an apparatus embodying the invention.

The invention contemplates the solvent extraction of oils, fats, and waxes from extractable materials, preferably a non-inflammable, non-explosive solvent which is recovered and reused in the extraction. Extractable material, such as soy bean flakes, for example, may be passed through an extraction chamber through which solvent is also passed, the solvent and extractable material being passed in countercurrent flow through the chamber. The oil-bearing solvent is withdrawn from the chamber, as is the extracted material. Preferably, the extractable material is carried through the chamber by a conveyor, such as an endless conveyor, which then carries the extracted material through a drying chamber. In the drying chamber, the conveyor and the extracted material carried thereby may be heated to remove residual solvent from the material. As the movement of the conveyor continues, the dried extracted material is released, and additional material is picked up by the conveyor. The conveyor, while still hot and containing untreated material, is again passed through the extraction chamber. The heated conveyor serves to heat the solvent in the extraction chamber, with the greatest heat being applied to the solvent which contains a maximum quantity of the oil, fat or wax. In this manner, the heat which is applied to the conveyor and material carried thereby in the drying chamber to remove the residual solvent is also utilized for heating the solvent in the extraction chamber.

The invention is applicable to solid substances containing extractable materials in which the solid substances are preferably in such a form as to absorb the solvent for the extractable material. In the case of such materials as soy beans, cottonseed, flaxseed, and peanuts, the material is preferably in bulk form. The material may be crushed or otherwise suitably prepared in this form so as to provide maximum absorbent qualities with respect to the solvent.

Any suitable solvent may be used. The invention is, however, particularly suitable for use in connection with the non-explosive, non-inflammable solvents which are relatively expensive and therefore are used only with difficulty and at a relatively high cost in otherwise economical processes. Suitable solvents which are non-explosive and non-inflammable are the halogenated hydrocarbons, and particularly the chlorinated hydrocarbons, for example, trichlorethylene, methylene chloride, dichlorethylene, and 1,1,1,2-tetrachloro 2,2-difluoroethane.

In the specific embodiment of the invention illustrated herein, a solid substance from which oil is to be extracted, for example, soy beans, may be introduced into the hopper 10, preferably in the form of flakes, and from this hopper 10 into the vertical leg 11 of the endless housing 12. The material is received by the endless conveyor 13 within the housing 12 and carried downwardly in the direction of the arrow. The conveyor 13 may be of any suitable construction and may, as illustrated, include a link belt or chain 14 provided with extending lugs 15, the chain 14 being received on the sprocket wheel 17 and the drum 16, and driven by the sprocket 17. The lugs 15 may be of any suitable type, but are preferably in the form of extending prongs or otherwise arranged so as to permit the free flow of solvent in the housing 12 in a direction opposite to the movement of the conveyor. The drum 16 is freely rotatable and acts as a rotatable idler support for the conveyor.

The lower horizontal portion 18 of the housing 12 provides an extraction chamber through which the conveyor 13 moves the material, the conveyor and the material traveling in the direction of the arrow.

Solvent may be introduced into the leg 19 of the housing 12 through the inlet 20 and flow downwardly through the leg 19 and the extraction chamber 18 in the direction indicated by the dotted line arrow. An outlet 21 permits the withdrawal of the solvent at the opposite end of the extraction chamber.

The solvent in the extraction chamber is at a level 22 which will vary in height in relation to the inlet 20, depending upon the resistance offered to flow by the material being extracted, it being necessary to maintain sufficient height of solvent to cause the solvent-oil mixture to flow out of the extractor at the height 42. As the conveyor 13 passes beyond the point 22, the extracted material moved thereby is withdrawn from the liquid solvent. As the extracted material moves from the point 22 to the top of the idler drum 16, part of adhering solvent drains downward. If desired, the drum 16 may be provided with a suitable tire meshing between the prongs of the conveyor chain and thus reducing the cross-sectional area through which the extracted material must pass, thereby applying to the extracted material sufficient pressure to squeeze out additional liquid solvent from the material. This liquid solvent drains down through the vertical leg 19 to the liquid solvent body below the inlet 20.

The conveyor carrying the extracted material passes beyond the drum 16 into a drying chamber 23 where the conveyor and the material carried thereby are heated to remove residual solvent from the extracted material and at the same time to heat the conveyor. The drying chamber may be of any suitable type and, as illustrated, a jacket 24 is placed around the portion 23 of the housing 12 so as to heat the same. The jacket may be heated with steam or any other suitable means. As the conveyor reaches the end of the drying chamber 23, the extracted material carried thereby is dried and is released and discharged through the outlet 25 which may be provided with a barrel valve or the like 26 through which the material may be discharged without the appreciable loss of solvent vapor.

The empty conveyor then continues on about the sprocket wheel 17 and through a heater jacket 27, which if desired may be used to further heat the conveyor. The heated conveyor then receives fresh untreated material from the inlet 10 and continues on to introduce this material into the extraction chamber 18.

The solvent system includes the outlet 21 for the oil-bearing solvent and a conduit 28 through which the oil-bearing solvent is introduced into a preheater 29 and thence through a conduit 30 to a steam stripper 31 for removing the solvent from the extracted oil. The solvent vapors then pass through a conduit 32 to a condenser 33. The condensed material then goes to a separator 34 in which the solvent and any water are separated and the solvent is passed to a storage tank 35. A pump 36 forces the solvent through the conduit 37 to the inlet 20.

The solvent which is driven off in the drying chamber 23 passes through the conduit 38 to a condenser 39. The condensed material flows through the conduit 40 to the separator 34. Gases which are not condensed in the condensers 33 and 39 pass through the conduit 41 into the leg 11 of the housing 12 at a point immediately below the inlet 10 for solid material. In this manner, the vents of the condensers communicate with the inlet for solid material so that any solvent which is not condensed in the condensers may be absorbed by the solid material which is being introduced into the system.

The conveyor 13 is preferably of metal or other material which will readily retain the heat imparted to it in the drying chamber so that this heat may be utilized in the extraction chamber. The heated conveyor travels from the drying chamber 23 to the extraction chamber 18 and comes in contact with the solvent when it reaches the liquid solvent level 42. The heated conveyor serves to heat the solvent and the heat-exchange relation between the conveyor and the solvent provides a simple and effective means of improving the efficiency of the extraction operation. Since the conveyor is at its highest temperature at the time that it comes in contact with the solvent immediately adjacent the outlet for the solvent, the portion of the solvent which receives the greatest quantity of heat is that which already contains the maximum quantity of oil or the like. As the conveyor travels through the extraction chamber 18 in a direction opposite to the flow of the solvent, it will heat the solvent throughout this chamber, but a temperature gradient will be established in which the solvent at the inlet 20 is at the lowest temperature and the solvent at the outlet 21 is at the highest temperature. This is desirable since the solvent at the highest temperature will perform a more complete and efficient extraction, and this need is greatest when the solvent has already taken up a substantial quantity of the oil.

Because the solvent is more effective at higher temperatures and dissolves larger quantities of oil more rapidly, the device may be operated with greater efficiency, both as to capacity and as to quality of product, than prior art devices. The increase in the temperature of the solvent also lowers the viscosity of the solvent and the oil contained in it, and accordingly the oil-bearing solvent flows more rapidly and more satisfactorily through the meal or flakes. Any tendency for the meal or flakes to pack and prevent ready penetration of the solvent is minimized by the reduction in the viscosity of the solvent and oil.

By reason of the lower viscosity of the solvent and oil at the oil-bearing solvent outlet 21, fine particles of solid material tend to settle more rapidly from the solvent, and any tendency for these particles to be carried out in the oil-bearing solvent is minimized.

With the apparatus of the invention, the heat which is utilized in drying the extracted material is also utilized for heating of the solvent. This heating operation is particularly advantageous because of the low temperature countercurrent heating which is obtained. Any tendency towards local overheating of the oil and solvent is avoided.

The heating of the oil in the extraction process is also advantageous in that the oil-bearing solvent which is delivered at the outlet 21 is already preheated and it is therefore not necessary to use as much heat in the preheater 29 in bringing the oil-bearing solvent to the desired temperature for the steam stripping operation.

The jacket heater 27 may be used or not depending upon the extent of the heating which is necessary or desirable. In some operations, it has been found that the heating of the conveyor in the drying chamber 23 provides ample heat for the solvent in the extraction chamber 18. On the other hand, in some instances it has been found desirable to impart additional heat to the conveyor before it is introduced into the solvent.

Although the heating of the conveyor may be used in connection with various extraction systems, it is particularly useful in the apparatus as illustrated in which uncondensed solvent is vented into the untreated material which is being introduced into the system since in this system solvent cannot vaporize and be lost into the air. Accordingly, the solvent may be heated in accordance with the present invention without danger of loss of the solvent from the system.

Although the invention has been described in connection with a specific embodiment, it will be apparent that modifications and changes may be made without departing from the spirit and scope of the invention.

We claim:

1. Apparatus for the solvent extraction of an extractable material, comprising a casing providing a chamber in the general shape of a loop, a portion of said loop providing an extraction chamber and having an inlet for the introduction of liquid solvent thereinto and an outlet for withdrawing the oil-bearing solvent therefrom, said inlet and said outlet being spaced apart and so arranged that solvent flows from said inlet through said extraction chamber to said outlet, a drier enclosing another portion of said chamber loop which is above said solvent level, and an endless conveyor extending through said looped chamber to carry said extractable material through the portion thereof containing solvent and thence through the portion thereof above the solvent level and enclosed by said drier, said chamber being provided with an outlet beyond said drier to release extractable material passing through said drier.

2. Apparatus for the solvent extraction of an extractable material, comprising a chamber in the general form of a loop extending in substantially a vertical plane, said chamber having a solvent inlet on one side and a solvent outlet on the opposite side for maintaining a liquid body of solvent in the lower portion of said loop, a conduit for flowing solvent into said inlet to maintain a liquid level within said chamber, a drier enclosing a portion of said chamber above said liquid level, an endless conveyor in said chamber for conveying said extractable material through said chamber countercurrent to the flow of liquid solvent therethrough and for carrying the material from said liquid body through the portion enclosed by said heater to dry said material and to heat said heater, an outlet for releasing said dried material from said chamber, and a conveyor actuator for immersing said heated portion of said conveyor after passing through said drying chamber into said liquid solvent adjacent the solvent outlet in said chamber.

3. Apparatus for the solvent extraction of an extractable material, comprising a casing providing a chamber in the general shape of a loop, a portion of said loop providing an extraction chamber and having an inlet for the introduction of liquid solvent thereinto and an outlet for withdrawing the oil-bearing solvent therefrom, said inlet and said outlet being spaced apart and so arranged that solvent flows from said inlet through said extraction chamber to said outlet, a drier enclosing another portion of said chamber loop which is above said solvent level, an endless conveyor extending through said looped chamber to carry said extractable material through the portion thereof containing solvent and thence through the portion thereof above the solvent level and enclosed by said drier whereby said conveyor is heated, said chamber being provided with an outlet beyond said drier to release extractable material passing through said drier, and a conveyor actuator for bringing said heated portion of said conveyor into heat-exchange relation with said liquid solvent adjacent the point where said solvent is withdrawn from said chamber.

4. Apparatus for the solvent extraction of an extractable material, comprising a chamber in the general form of a loop extending in substantially a vertical plane, said chamber having a solvent inlet on one side and a solvent outlet on the opposite side for maintaining a liquid body of solvent in the lower portion of said loop, a conduit for flowing solvent into said inlet to maintain a liquid level within said chamber, a drier enclosing a portion of said chamber above said liquid level, an endless conveyor in said chamber for conveying said extractable material through said chamber countercurrent to the flow of liquid solvent therethrough and for carrying the material from said liquid body through the portion enclosed by said drier to dry said material, an outlet for releasing said dried material from said chamber, and a member in said chamber constricting the same to squeeze said material when the same is drawn out of said liquid solvent by said conveyor.

5. Apparatus for the solvent extraction of an extractable material, comprising a chamber in the general form of a loop extending in substantially a vertical plane, said chamber having a solvent inlet on one side and a solvent outlet on the opposite side for maintaining a liquid body of solvent in the lower portion of said loop, a conduit for flowing solvent into said inlet to maintain a liquid level within said chamber, a drier enclosing a portion of said chamber above said liquid level, an endless conveyor in said chamber for conveying said extractable material through said chamber countercurrent to the flow of liquid solvent therethrough and for carrying the material from said liquid body through the portion enclosed by said drier to dry said material, an outlet for releasing said dried material from said chamber, and a member in said chamber constricting the same to squeeze said material when the same is drawn out of said liquid solvent by said conveyor, said constricting member consisting of a rotatable drum projecting into said chamber.

ORLAND R. SWEENEY.
LIONEL K. ARNOLD.

REFERENCES CITED

The following references are of record in the file of this patent:

UNITED STATES PATENTS

| Number | Name | Date |
| --- | --- | --- |
| 151,050 | Phelps | May 19, 1874 |
| 1,694,361 | Stirling | Dec. 4, 1928 |
| 2,227,605 | Swallin | Jan. 7, 1941 |
| 2,273,557 | Bonotto | Feb. 17, 1942 |
| 2,377,135 | Dinley | May 29, 1945 |